US011996277B2

(12) United States Patent
Stewart et al.

(10) Patent No.: US 11,996,277 B2
(45) Date of Patent: May 28, 2024

(54) METHOD OF GAIN CALIBRATION

(71) Applicant: Thermo Fisher Scientific (Bremen) GmbH, Bremen (DE)

(72) Inventors: Hamish Stewart, Bremen (DE); Johannes Petzoldt, Bremen (DE); Bernd Hagedorn, Bremen (DE); Dmitry Grinfeld, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 48 days.

(21) Appl. No.: 17/660,525

(22) Filed: Apr. 25, 2022

(65) Prior Publication Data

US 2022/0367165 A1 Nov. 17, 2022

(30) Foreign Application Priority Data

May 14, 2021 (GB) ...................................... 2106941

(51) Int. Cl.
*H01J 49/00* (2006.01)
*H01J 49/02* (2006.01)
*H01J 49/40* (2006.01)

(52) U.S. Cl.
CPC ........ *H01J 49/0036* (2013.01); *H01J 49/025* (2013.01); *H01J 49/406* (2013.01)

(58) Field of Classification Search
CPC .... H01J 49/0036; H01J 49/025; H01J 49/406; H01J 49/0009; H01J 49/165; H01J 49/0031; H01J 49/0027
USPC .................................................. 250/281, 282
See application file for complete search history.

(56) References Cited

U.S. PATENT DOCUMENTS

| | | | | |
|---|---|---|---|---|
| 7,109,474 | B2 | 9/2006 | Schwartz | |
| 9,564,301 | B2 | 2/2017 | Green et al. | |
| 2006/0080045 | A1 | 4/2006 | Steiner | |
| 2009/0108191 | A1 * | 4/2009 | Yefchak | H01J 49/025 250/252.1 |
| 2021/0013019 | A1 * | 1/2021 | Oshiro | H01J 49/0027 |

FOREIGN PATENT DOCUMENTS

| | | | |
|---|---|---|---|
| EP | 3382738 | A1 | 10/2018 |

* cited by examiner

*Primary Examiner* — Michael Maskell
(74) *Attorney, Agent, or Firm* — William R McCarthy, III

(57) ABSTRACT

A method of gain calibration for an ion detector operating at a detector voltage is described. The method includes steps of: generating single ions; determining a parameter of a first relationship between a detector output of an ion detector and a number of ions for a first detector voltage; detecting an ion peak at the ion detector using the first detector voltage; adjusting the detector voltage; and determining a parameter of a second relationship between the detector output and the number of ions for the second detector voltage. A system including a mass spectrometer arrangement and a controller configured to operate the mass spectrometer arrangement in accordance with this method is also described.

20 Claims, 8 Drawing Sheets

METHOD OF GAIN CALIBRATION

CROSS-REFERENCE TO RELATED APPLICATIONS

The present application claims priority benefit under one or more of 35 U.S.C. 119(a)-119(d) of GB Patent Application No. 2106941.4, filed May 14, 2021, which is hereby incorporated by reference herein in its entirety for all purposes.

FIELD OF THE INVENTION

The present disclosure relates to a method of gain calibration, particularly for use in a mass spectrometer.

BACKGROUND OF THE INVENTION

Mass spectrometry is an analytical technique that can be used to measure the mass-to-charge (m/z) ratio of ions. A mass spectrometer typically consists of three main parts: an ion source for producing ions, a mass analyser for separating ions by m/z and an ion detector for detecting the separated m/z ions.

Ion detectors measure the charge induced or the current produced when an ion passes by or hits a surface of the ion detector. Since single particles generally produce effects too small to directly detect at non-relativistic energies, ion detectors generally amplify the signal produced by a passing/indicant ion such that it can be measured. Typically, this is done by converting an incident ion into secondary electrons.

The gain of the ion detector (number of electrons generated per incident ion) is normally controlled by setting the voltage across an electron multiplication stage, as well as the energy of the incident ions. It is generally preferable for a detector to operate at sufficient gain to reliably detect single ions, and so maximise sensitivity. However, excessive gain reduces the dynamic range of the detector (the ratio between the largest and smallest values that can be detected), which is a key factor of performance. Excessive gain also accelerates ageing that compromises the lifetime of the detector. Furthermore, ageing and short-term effects, such as desorption of water, cause perceptible change in gain, even over the course of a day.

In addition to the need for reliable ion detection, the current output by a detector allows measurement of the number of ions in the signal, and thus provides quantitative information of an analyte. Mass spectrometers incorporating ion traps also commonly require measurement of ion current to regulate the number of ions stored within the trap during analysis, to prevent harmful space charge effects, in a process referred to as "automatic gain control". Therefore, regular gain calibration is important for accurately determining the number of ions in a signal.

Conventional mass spectrometers generally incorporate routines to measure and calibrate detector gain, which must be run regularly. These routines are normally too slow to monitor and/or recalibrate detector gain during or between experimental runs, and are instead operated as part of daily and/or weekly calibration routines.

Time-of-flight (TOF) mass analysers operating at repetition rates of 10-30,000 Hz commonly use microchannel plate (MCP) based detectors, for example as described in US 2004/0206911, for their even detection surface and sub-ns level time response, which is best for high resolution. A standard detector incorporating a pair of chevron MCPs 101 for enhanced gain is shown with reference to FIG. 1, which will be briefly explained below.

A microchannel plate 101 is made from a highly resistive material and contains an array of channels extending between a first face and a second face of the microchannel plate 101. The channels are parallel to each other and are typically at a small angle to a normal of the MCP input surface (e.g. about 8°). In the pair of chevron MCPs 101 shown in FIG. 1, the channels of the two plates 101 are angled relative to each other to form a chevron (v-like) shape.

Ion packets 102 hit the MCP 101. A particle 102 that enters one of the channels is guaranteed to hit the channel wall, due to the angled channel, and emit secondary electrons 103. The secondary electrons 103 are accelerated within the resistive channel of MCP 101 and emit further secondary electrons 103 when they hit the channel walls, amplifying the original signal in cascades of electron-to-electron conversion. Electrons exiting the first plate 101 start a further cascade in the second plate 101.

The gap between the MCPs 101 in FIG. 1 allows charge to spread across multiple channels, which increases gain. The MCPs could alternatively have no gap between them, to preserve spatial resolution.

The chevron dual MCP 100 shown in FIG. 1 is characterized by: gain 1E+6 to detect individual ions, and less than one Coulomb (1 C) life time, measured at the second MCP 101 output. The chevron dual MCP 100 may alternatively have an operational lifetime of 3 C or 10 C. This may be gain dependent and lifetime may increase in inverse proportion to the gain.

Chevron MCPs tend to suffer from limited dynamic range, although fast detector schemes capable of linear detection from single ions to greater than 1000 ions per pulse are also described, for example dynode chains with magnetic electron focusing as described in U.S. Pat. No. 6,982,428 and MCPs/dynodes conjoined with scintillator/photomultiplier combinations to add additional gain stages in U.S. Pat. No. 7,180,060.

A standard method of detector calibration (e.g. for the MCP detector shown in FIG. 1) is to measure the response of single ions at different detector gain settings. Measurement of single ion pulse intensity or area gives the most direct measurement, whilst measurement of the rate of single ion pulses gives a measurement of the ion current, and a plateau of a plot of count rate against detector voltage represents an optimum voltage setting for efficient single ion detection. An example of this plot is shown in FIG. 2, based on a similar drawing in Prohaska et al, *Sector Field Mass Spectrometry for Elemental and Isotopic Analysis, Royal Society of Chemistry,* 2015.

As can be seen in FIG. 2, increasing the detector voltage initially results in a steep increase in the count rate. However, there is a plateau region in the curve where an increase in the detector voltage has only a small effect on the count rate. It is advantageous to operate in this plateau region for efficient single ion detection. As shown in FIG. 2, as the detector voltage is further increased beyond the plateau region, the count rate begins to increase sharply again.

An issue arises that a reliable measurement of the single ion area is difficult at the minimum gain level required to detect such ions, as they sit around the level of noise. Instead, such values may be inferred from a calibration of the trend of single ion areas measured at a range of higher gains. U.S. Pat. No. 9,564,301 shows another example of single ion measurement in time-of-flight instruments, where detection optimisation is performed by comparing single ion and noise peaks.

The primary difficulty of single ion measurements is avoiding simultaneous detection of multiple ions. The instrument may be detuned to attenuate the ion beam and reduce the probability of multiple ion impacts, but with the problem of creating many empty acquisitions. For instruments with a KHz level acquisition rate, such as orthogonal-time-of-flight analysers (for example), this is not a great problem, but for instruments incorporating ion traps and operating at lower acquisition rates, i.e. significantly smaller than 1 kHz, the calibration procedure becomes prolonged or unreliable.

Ion trap instruments may instead incorporate measurements of ion population based on the statistical variation of peak intensities of multiple ion populations over many acquisitions, as described in U.S. Pat. No. 7,109,474. This method eliminates the need for single ion measurement and produces very consistent results. It is, however, relatively slow and suffers from large systematic errors caused by additional sources of noise in the peak intensity, such as the number of secondary electrons/ions produced from an incident analyte ion.

US 2021/0013019 describes applying a voltage to an electrode so that ions having the same m/z simultaneously ejected from an ejector are dispersed in a temporal direction so that a plurality of low peaks corresponding to individual ions are observed on a profile spectrum. The peak height of each peak in the profile spectrum is determined the median of these values is determined. If the median peak height is not within a predetermined reference range, the detector voltage is increased by a predetermined amount. The process is repeated until the determined median of the peak heights is within the reference range and then the detector voltage at that point is selected as the optimum voltage.

U.S. Pat. No. 10,593,525 describes a method of calibrating a time-of-flight mass spectrometer (TOF MS) mass spectrum to account for temperature changes. Ions are introduced into a Fourier Transform Mass Spectrometer (FTMS) and their mass-to-charge ratios are determined. Ions, including calibrant ions, are also introduced into a TOF MS and the m/z ratios of the calibrant ions at least are also determined. Specific peaks representative of calibrant ions are selected and matched between the TOF MS and FTMS spectra. The relative position of matched peaks in each spectrum is then used to determine a temperature correction factor for the TOF MS data, based upon the relative independence of the FTMS spectrum with respect to temperature.

Detector gain variation and instability in conventional methods described above presents issues with efficient single ion detection, dynamic range and quantification of number of ions detected within a time-of-flight analyser. The conventional approach also lacks an accurate way to measure and calibrate the detector, fast enough to be carried out in practice within or between experimental runs, even for relatively slow analysers incorporating ion traps.

A method of gain calibration that overcomes these problems is desirable.

SUMMARY OF THE INVENTION

According to the present disclosure, there is provided a method of gain calibration for an ion detector operating at a detector voltage.

The method comprises steps of:

generating single ions;

determining a parameter of a first relationship between a detector output of an ion detector and a number of ions for a first detector voltage, by detecting single ions at the ion detector;

detecting an ion peak at the ion detector using the first detector voltage, to determine a number of ions in the ion peak, based on the parameter of the first relationship;

adjusting the detector voltage to reduce a ratio between the detector output and a noise level and thereby obtain a second detector voltage at which the detector output for the ion peak remains above the noise level;

determining a parameter of a second relationship between the detector output and the number of ions for the second detector voltage, based on the determined number of ions in the ion peak.

Using this method, an optimum detector voltage can be accurately and more quickly determined. The optimum detector voltage provides sufficient gain to reliably detect single ions, and thus maximise sensitivity. Excessive gain reduces dynamic range of the detector and accelerates aging, so accurately determining the optimum output detector voltage can improve the lifetime and dynamic range of the detector. Advantageously, in some cases, the optimum detector voltage can be determined without the need to plot a calibration curve of single ion responses.

The method may further comprise monitoring the gain calibration of the ion detector. This may include detecting a second ion peak at the ion detector using a third detector voltage. The third detector voltage may be the same as the first detector voltage used during the initial gain calibration. Alternatively/additionally, the third detector voltage may be a high gain voltage. Monitoring the gain calibration may further include steps of determining the number of ions in the second ion peak and determining a second parameter of the second relationship between the detector output of the ion detector and the number of ions for the third detector voltage, based on the determined number of ions in the peak. The number of ions may a single ion or a plurality of ions. The monitoring may further include comparing the second parameter of the second relationship to an expected value, based on the second relationship and determining, based on the comparison, whether a drift in the gain has occurred. The expected value of the second parameter may be determined based on a calculated calibration curve or may be the determined first parameter of the second relationship.

Therefore, the calibration of the gain can be quickly monitored during or between experimental runs, instead of being operated as part of daily or weekly calibration routines.

Based on determining that a drift in the gain has occurred, an adjustment or correction parameter may be calculated to adjust the detector voltage to a level at which the relationship between the detector output and the number of ions corresponds to the expected value of the second parameter of the second relationship, based on the second relationship. The detector voltage can then be set, based on the correction parameter/factor.

This monitoring can be carried out without the need to plot a calibration curve, as the trends of the previously acquired relationships can be assumed to be true, thus providing fast gain correction. The drift in the gain of the ion detector can thereby be quickly corrected between or during experiments following the monitoring of the gain.

The ion detector may be operated at the second detector voltage. The second voltage advantageously provides sufficient gain to reliably detect single ions and so maximise sensitivity, whilst limiting excessive gain that accelerates ageing and reduces dynamic range of the detector.

The ion detector may form part of a time-of-flight mass spectrometer. In this case, the single ions may be obtained by setting the TOF MS to operate in a time-defocused mode, in which ions having the same mass-to-charge ratio arrive at the ion detector at different times.

Advantageously, this method of generating single ions means that many single ion pulses can be registered in a single acquisition, making single ion calibration accessible even to relatively slow analysers, such as multi-reflection time-of-flight (MR-TOF) analysers. Statistical methods based on pulse height variation may be used with such analysers, but are slow and may contain substantial systematic errors. Defocusing ions to produce single ions also avoids the need for careful attenuation of an ion beam to remove multiple ion peaks but minimise empty spectra, which would be required via beam attenuation methods.

Detecting the second ion peak may comprise setting the TOF MS to operate in the time-defocused mode, such that the second ion peak corresponds to a single ion. The single ion response used to determine the parameter of the first relationship may then be directly compared to the single ion response of the second peak, such that monitoring the drift gain may be faster.

The detector voltage may be step-wise adjusted (i.e. adjusted in small stages). A calibration curve can then easily be calculated based on the detector output generated by detecting ions at the ion detector for each detector voltage step.

The first relationship and the second relationship may be the same relationship, where the parameter of the first relationship and the parameter of the second relationship are different. In this way, a direct comparison can be made between the parameters, allowing for faster gain calibration/monitoring.

The ion detector may comprise a first ion detector device; and a second ion detector device. The second ion detector device may form part of a time-of-flight mass (TOF) mass spectrometer (MS) or an ion trap. The steps of determining a parameter of a first relationship and detecting an ion peak at the ion detector may be performed with respect to the first ion detector device. The steps of adjusting the detector voltage and determining a parameter of a second relationship may be performed with reference to the second ion detector device. Thus, the first ion detector device can be used to calibrate the gain of the second ion detector device. This may provide a straight-forward gain calibration that is fast and relatively stable. The gain calibration may also be advantageously carried out with other cross-calibration methods e.g. mass cross-calibration between the first and second ion detector devices.

The first ion detector device may form part of a Fourier transform mass spectrometer. The FTMS may be an orbital trapping or Fourier transform ion cyclotron resonance (FT-ICR) mass spectrometer. The output of an FTMS (the position and shape of peaks in a mass spectrum it generates) is relatively stable over time (e.g. with respect to short and long term shifts in temperature) and so provides a convenient and stable way of providing gain cross-calibration or monitoring gain calibration.

Furthermore, since the behaviour of the FTMS is sufficiently similar over time and across other instruments of the same type, the calibration of one particular instrument (e.g. a first orbital trapping mass spectrometer) can be applied to another instrument of the same type (e.g. a second orbital trapping mass spectrometer). That is, the number of ions that produces a particular output (e.g. signal-to-noise ratio) becomes a known property for a class of instruments, rather than something that must be calibrated for each instrument.

Detecting the second ion peak at the ion detector may be performed with respect to the first ion detector device and the step of determining a parameter of a third relationship may be performed with reference to the second ion detector device. Thus, the more stable first ion detector device can be used to monitor gain calibration of the second ion detector device over time.

The parameter or factor of the first relationship may be a signal-to-noise (S/N) ratio. The S/N ratio of an instrument (e.g. an FTMS) may be proportional to the number of ions in a detected ion peak and thus can be used to determine how many ions are in a subsequently detected ion peak.

An FTMS may be used to detect multiply-charged single ions at the first ion detector device and the S/N ratio of the multiply-charged single ions calculated. The S/N ratio of a singly-charged single ion may then be determined, based on the calculated S/N ratio of the multiply-charged single ions. The S/N ratio of the singly-charged single ion may then be used as a proportionality constant between the number of ions in a detected ion peak and the S/N ratio of the detected ion peak.

A correction factor may be applied to the determined number of ions in the ion peak, to account for transmission of ions to the second ion detector device. The correction factor may be between 30% and 50%. Applying the correction factor increases the accuracy of the gain calibration when cross-calibrating between two ion detector devices.

Single ions may be generated via beam attenuation, fragmentation, scattering ions with background gas or using an electrospray ionisation (ESI) source. Thus, the gain calibration can be carried out on a variety of instruments.

The methods described above may be implemented as a computer program comprising instructions to operate a computer or computer system. The computer program may be stored on a computer-readable medium.

The computer system may include a processor, such as a central processing unit (CPU). The processor may execute logic in the form of a software program. The computer system may include a memory including volatile and non-volatile storage medium. A computer-readable medium may be included to store the logic or program instructions. The different parts of the system may be connected using a network (e.g. wireless networks and wired networks). The computer system may include one or more interfaces. The computer system may contain a suitable operating system such as UNIX (including Linux), Windows®, for example.

The above methods may be implemented in a system comprising a mass spectrometer arrangement and a controller configured to operate the mass spectrometer arrangement.

It should be noted that any feature described above may be used with any particular aspect or embodiment of the invention. Moreover, the combination of any specific apparatus, structural or method features is also provided, even if that combination is not explicitly disclosed.

BRIEF DESCRIPTION OF THE DRAWINGS

The present invention may be put into practice in a number of ways and embodiments will now be described by way of example only and with reference to the accompanying drawings, in which.

It should be noted that the Figures are illustrated in schematic form for simplicity and are not necessarily drawn to scale. Like features are provided with the same reference numerals.

DETAILED DESCRIPTION OF PREFERRED EMBODIMENTS

Figure 3A:
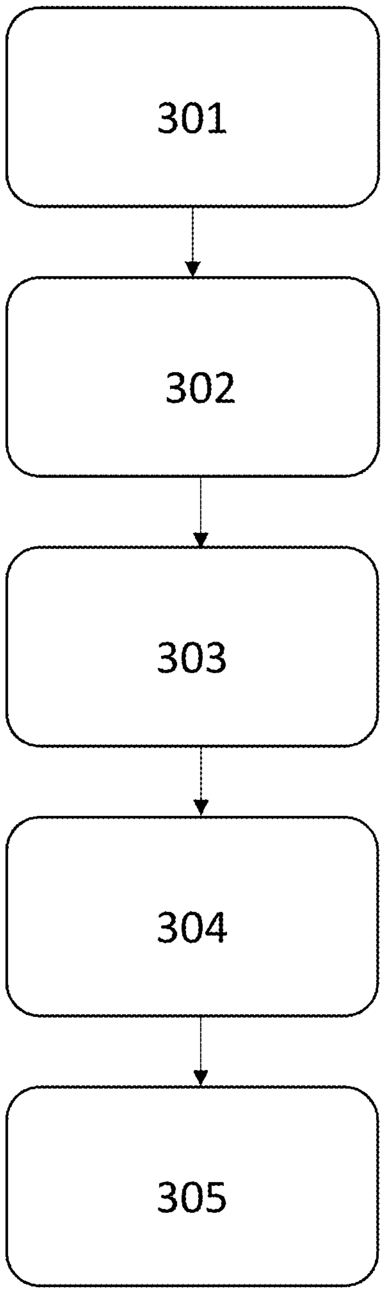
FIG. 3A depicts a flowchart method for calibrating ion gain.

FIG. 3A shows a flowchart of a method of gain calibration for an ion detector. At step 301, single ions are generated, in order to measure a single ion response. The single ions can be generated by breaking up a concentrated packet of ions that would arrive at the detector at a particular time into single ion arrivals at many different times.

The step 301 of generating single ions can be achieved by various methods. For example, a time-defocusing method that will be described in more detail herein with reference to FIG. 4 can be used. Alternatively, fragmentation can be used to turn one mass of ions into several (or many) fragments. This spreads ions out over many different m/z values with a much wider range of possible flight times, which greatly increases the probability that those ions arrive as single ions. Any method of fragmentation could be used to achieve this, such as collision-induced dissociation (CID), surface-induced dissociation (SID), electron-transfer dissociation (ETD), photodissociation, in-source fragmentation and so on.

Another method of generating single ions in step 301 that may be used is scattering ions with background gas. In this method, ions strike the gas molecules and emerge with an energy and time deviation compared to other ions of the same mass. The time and energy difference is likely to be large enough that the system is unable to refocus the ions and the scattered ions arrive at very different times, such that single ions can be detected.

Also, single ions could be generated by beam attenuation. Alternatively, single ions may be produced using an electrospray ionisation (ESI) source. Generally, ion current stability for commercial electrosprays is about 4% shot-to-shot for a calibration mixture (i.e. the ion current does not vary greatly between scans). Consistency between ion current measurement (ion number) and the presence of a similar current in immediately subsequent measurements is an important pre-requisite for critical processes, such as control of ion population (e.g. automatic gain control, AGC), which is widely used to optimise the number of ions delivered into orbital trapping mass spectrometers and other ion trap instruments. Therefore, this tolerance is more than sufficient for accurate calibration using the methods disclosed herein. The single ions are detected at an ion detector operating at a first detector voltage. In step 302, a parameter of a first relationship between an output of the ion detector (e.g. a current or voltage) and a number of ions for the first detector voltage is determined, by detecting the single ions at the ion detector. For example, an ion detector at a first detector voltage (e.g. 1800V) might produce an average 5 mV peak for a single ion. The parameter might therefore be a factor of 5 mV per ion. That is, the output of the detector can be regarded as a factor between the number of ions and the output of the detector. Alternatively, the parameter might be a S/N response of a single charge, as the S/N ratio may be proportional to a number of ions in an ion peak. In order to use the S/N response as a parameter, the S/N ratio of the detector should be relatively stable over time. The S/N ratio of a single charge may be, for example, 4.0±0.4, such that the parameter is a factor of 4.0 per ion.

The method may proceed to step 303, in which an ion peak is detected at the ion detector using the first detector voltage, to determine a number of ions in the ion peak, based on the parameter of the first relationship. The ion peak could be a multiple-ion peak (i.e. the number of ions in the ion peak determined in step 303 should be greater than one). Based on the 5 mV per ion factor given above in respect of step 302, a detected ion peak of 200 mV intensity might correspond to a determination that there are 40 ions in the ion peak. In the case where the S/N response factor of 4.0 per ion is used, a 200 mV intensity peak may correspond to a determination that there are 50 ions in the ion peak.

Figure 1:
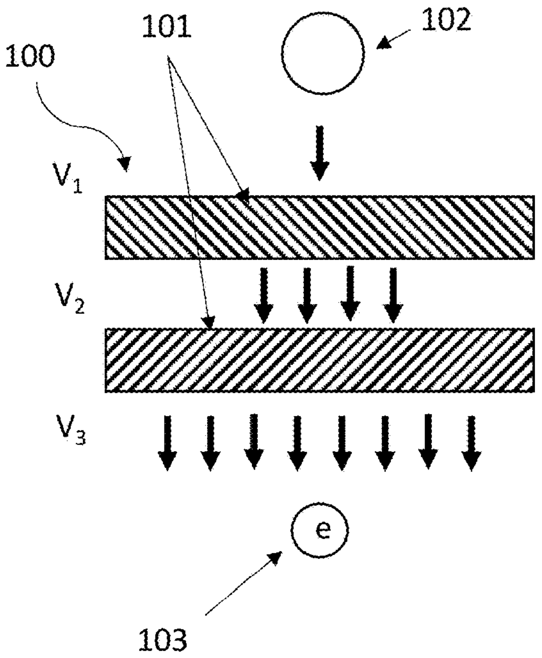
Figure 1 (Prior art)
FIG. 1 shows a detector incorporating a pair of chevron MCPs.
Figure 2:
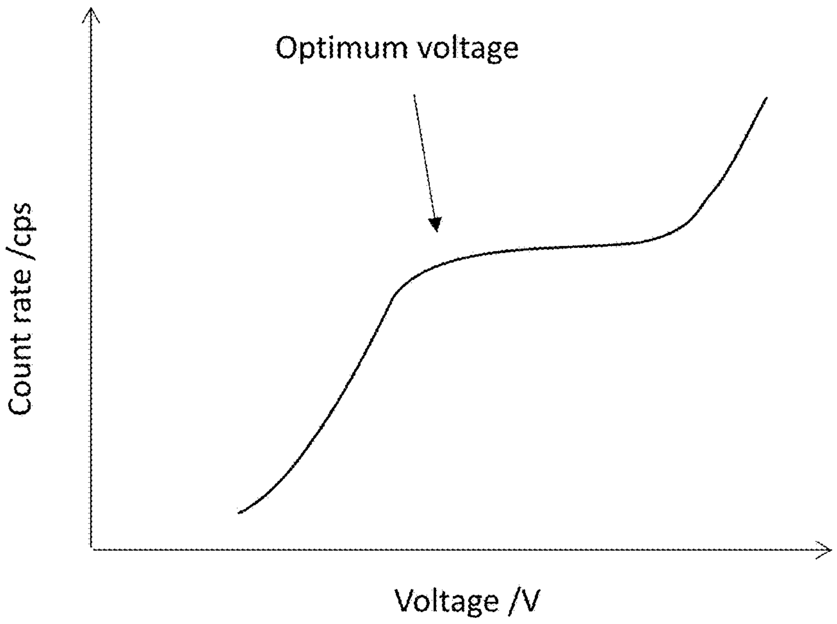
Figure 2 (Prior art)
FIG. 2 illustrates a plot of count rate against detector voltage for detector calibration via a single ion counting plateau.
Figure 8:
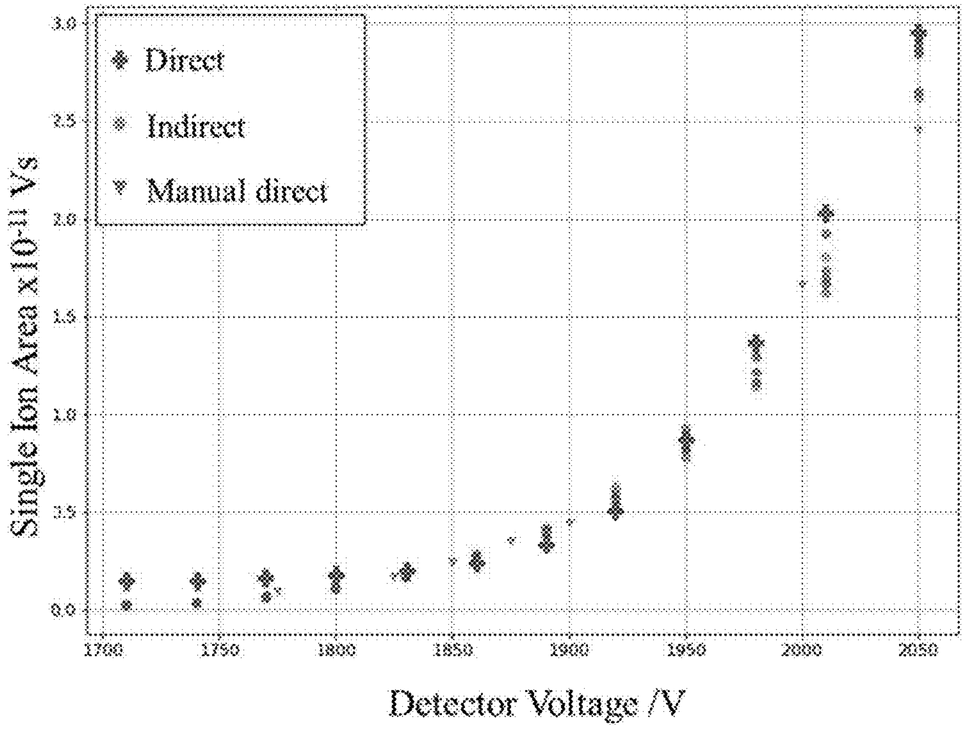
FIG. 8 shows calibration plots generated by repeated indirect single ion measurement and direct single ion measurement experiments, as well as hand measurements.

At step 304, the detector voltage is adjusted (increased or decreased) to reduce a ratio between the detector output and a noise level and thereby obtain a second detector voltage at which the detector output for the ion peak remains above the noise level. A signal at least 10 times above the noise level is sufficient, and preferably, the signal is 30 times or 100 times the noise level. If the signal is much larger than this, a single ion pulse may be large enough to saturate the detector. The detector may be adjusted step-wise and steps 302-304 repeated until the ratio between the detector output and the noise level is sufficiently reduced and/or the ion peak remains above the noise level. The single ion response and voltage data acquired during these steps can be used to plot a curve of the relationship between the detector output of the ion detector and the number of ions for a first detector voltage (e.g. as shown in FIG. 2 or FIG. 8). This may be referred to as a calibration curve.

Since the detector voltage has been adjusted, the signal intensity of the ion peak detected by the ion detector for the same number of ions will also have changed. That is, the determined parameter of the first relationship may not necessarily be an accurate representation of the relationship between the output of the detector and the number of ions for the second detector voltage. However, the determined number of ions in the ion peak is known from step 303. Therefore, in step 305, a parameter of a second relationship between the detector output and the number of ions for the second detector voltage is determined, based on the determined number of ions in the ion peak (step 303).

For example, an ion peak of 300 mV intensity (if the ion detector voltage was increased in step 304), corresponding to 40 ions (as determined from steps 302 and 303), might result in a factor of 7.5 mV per ion for the determined parameter of the second relationship. If the ion detector voltage was instead decreased in step 304, the factor would decrease.

It should be noted that it is not necessary for the ion peak measured at the second detector voltage to comprise the exact same number of ions as the ion peak measured at the first detector voltage. As long as the number of ions is approximately the same, accurate calibration can be achieved using the methods disclosed herein. For example, even a 10% difference in the number of ions in detected ion peaks is more than sufficient to achieve accurate calibration.

Furthermore, it is possible to apply a correction factor to account for ion losses in the ion detector device and/or variability in the number of ions in a detected ion peak.

Another option is to average the number of ions over several scans, which may be useful if an ion source is particularly noisy. Significant source drift is unlikely to occur in the course of these scans, and can be corrected if it does occur. Correction may comprise varying the order of the steps for the detector voltage scan, or performing a single ion to multiple ion comparison (e.g. as discussed with reference to FIG. 7) several times and calculating an average, for example.

In any case, a multiple ion peak may comprise many hundreds of ions, such that ion statistics do not play a substantial role. For averaged measurements of multiple scans, especially with hundreds or thousands of ions, the statistical variation in the number of ions between two measurements, or the signal generated by each ion, becomes even more insignificant. Thus, sufficiently accurate calibration is possible using the methods disclosed herein, even when the number of ions in the detected ion peaks are not exactly the same.

The parameters of the first and second relationships do not need to represent the same relationship. Preferably when using the S/N factor as a parameter of the first relationship, the second parameter represents a different relationship. For example, using the values obtained using the 4.0 S/N factor, a 300 mV intensity peak corresponding to 50 ions may correlate to the parameter of the second relationship being a factor of 6 mV per ion.

Figure 3B:
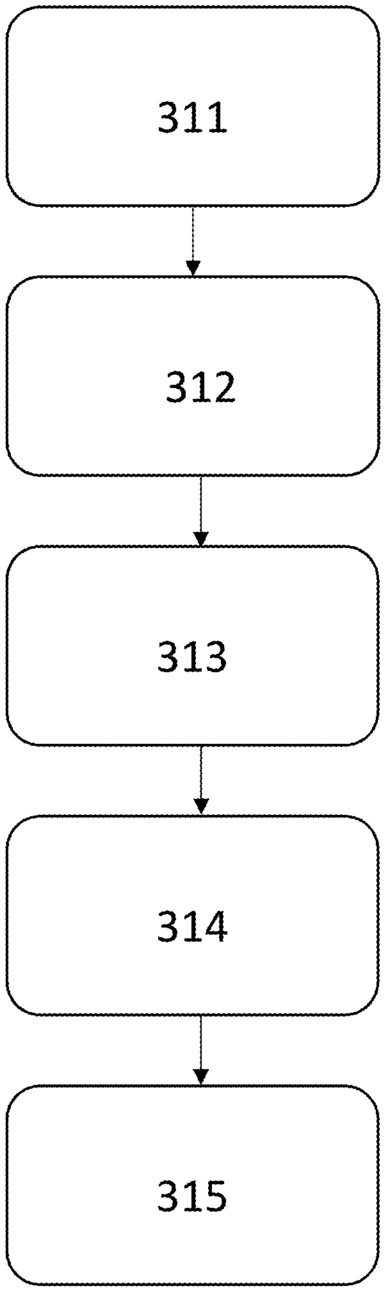
FIG. 3B shows a flowchart method for monitoring ion gain calibration.

The gain calibration of the ion detector can also be monitored over time using the method illustrated in FIG. 3B.

At step 311, a second ion peak may be detected at the ion detector using a third detector voltage. This voltage may be the same as the second detector voltage or may be another voltage (e.g. a high gain voltage). The second ion peak may correspond to a single ion or multiple ions. In the single ion case, single ions may be generated using any of the methods discussed above, but most preferably using the time-defocussing method that will be described with reference to FIG. 4.

Step 312 involves determining the number of ions in the second peak. For a multiple-ion peak, this may be determined based on the parameter of the first relationship, which may be a S/N ratio for a single charge. S/N ratios may be proportional to the number of ions detected in an ion peak and may be relatively stable over time, such that they do not need to be calculated more than once.

At step 313, a second parameter of the second relationship between the detector output of the ion detector and the number of ions may be determined, based on the determined number of ions in the second ion peak. The second parameter may therefore be a factor between the number of ions and the output of the detector.

In step 314, the second parameter of the second relationship is compared to an expected value, based on the second relationship. This may be a direct comparison between the first parameter of the second relationship and the second parameter of the second relationship. For example, the first parameter determined as 7.5 mV per ion in step 205 may be considered as the expected value and compared to the second parameter determined in step 313 (e.g. 6 mV per ion). Alternatively, the expected value of the second relationship may be determined based on a calibration curve, which may be obtained, for example, during steps 302-304. At step 315, it may be determined whether a drift in the gain has occurred, based on the comparison. For example, if a value of the first parameter of the second relationship and a value of the second parameter of the second relationship differ, it may be determined that a drift in the gain has occurred. Alternatively, if the expected value of the second relationship from the calibration curve differs from the second parameter of the second relationship, a gain drift may have occurred. There may be a tolerance level for this determination, below which it will not be determined that a drift gain has occurred. This may avoid excessive correction of the gain calibration.

Following a determination that a drift in the gain has occurred, an adjustment parameter may be calculated, in order to adjust the detector voltage to correct the drift in the gain. The adjustment parameter may be calculated to adjust the detector voltage to a level at which the relationship between the detector output and the number of ions is determined by the first parameter of the second relationship. The adjustment parameter may be calculated based only on the calibration curve.

The calibration curve describes a change in signal response for a particular change in voltage. The assumption is that the shape of the curve does not change as the detector gain decreases, though the proportions may change. That is, if the single ion area is re-measured and the result shows that the gain of the detector has decreased, the calibration curve can be used to determine a proportional voltage (or alternatively, an absolute voltage shift) that returns the gain to the expected level. For example, if the gain has decreased by 50%, the expected gain can be achieved by determining a proportional voltage that would result in a 100% increase on the calibration curve. The detector voltage may then be set to a new voltage based on this adjustment parameter.

As discussed briefly above, single ions are generated in step 301, which can be achieved through various methods. One such method involves time-defocusing a TOF analyser.

TOF analysers normally use an ion mirror to focus an arrival time of ions of the same m/z to the narrowest possible period at the detector. This can achieve resolutions of 10-90K, depending on flight-path length and focus quality.

Figure 4:
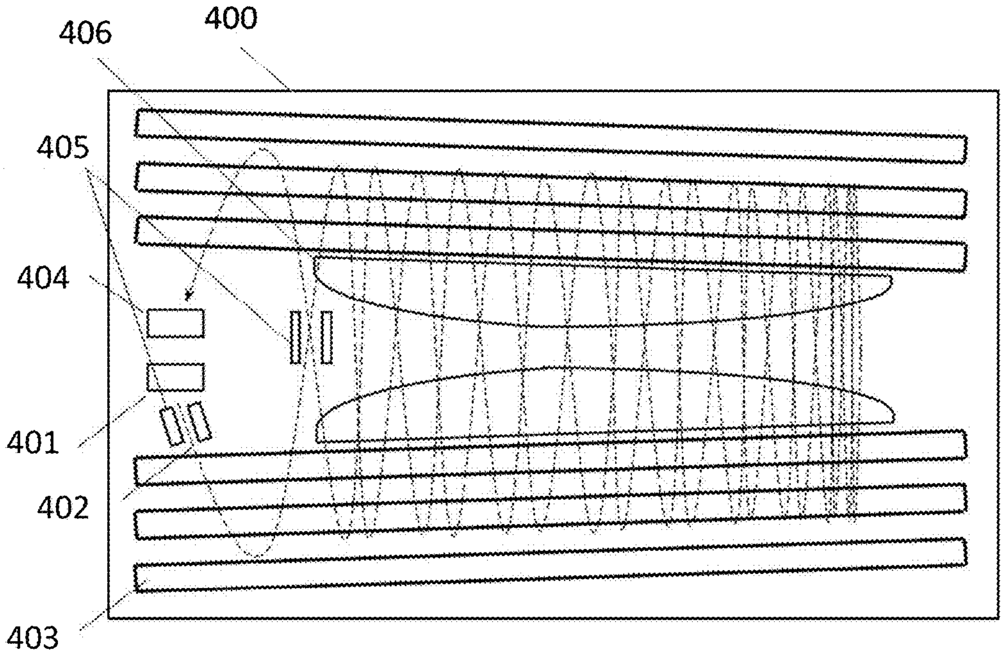
FIG. 4 illustrates a multi-reflection time-of-flight that can be used with the methods described herein to calibrate ion gain.

Multi-reflection time-of-flight (MR-TOF) instruments incorporate opposing ion mirrors, between which a packet of analyte ions may undergo multiple reflections and thus travel a greatly extended flight path within a small analyser volume. An example of an MR-TOF analyser is shown in FIG. 4. Ions are accumulated using a pulsed extraction ion trap 401, which serves as an ion source, and ejected into the analyser via a pair of deflectors 405. The deflectors 405 allow for an optimum injection angle and for aligning the ion packet's focal plane with the analyser 400. The ions reflect back and forth between two elongated ion mirrors 403, and drift down the direction of mirror elongation. The two ion mirrors 403 are tilted with respect to one another, which creates an increasing average potential in the drift dimension that slows the drift velocity of the ions and causes the ions to be reflected back in the drift dimension and focused onto a detector 404. Errors in the time-of-flight caused by the tilting of the mirrors are corrected by "stripe electrodes" 406 that run the length of the drift space, allowing a narrow time focus.

In such an analyser (which may have a 20 m flight path, for example), a small shift in the power supplies between the ion mirrors 403, e.g. <5%, is sufficient to completely time-defocus even relatively strong ion packets at the detector into single ions. For example, ions with a m/z of 500, which might normally be focused to a <4 ns peak might instead be spread over about a microsecond. That is, ions having the same m/z reach the detector at different times, instead of temporally converging. The signal may thereby be split up into about 1000 individual peaks, each having a width of about 1 ns. A signal of 100 ions will split up into 100 single-ions peaks, with a low probability for some of these peaks to overlap. Hence, the recording of single-ion signals will be faster by two orders of magnitude compared to attenuating a focused peak down to a single ion. This is within the control means of ion trap automatic gain control and eliminates the need for beam attenuation via detuning of ion optics. The about 700 μs average flight time of the defocused single ions remains similar to that of 500 m/z ions in normal operation, and the low μs level spread allows a rough retention of m/z assignment, which may be improved with appropriate calibration. Ideally deflector and/or stripe electrode voltages would also be adjusted to maintain optimum transmission of ions to the detector, though this is not necessary.

A similar result may be achieved with a single-reflection ToF analyser with a smaller (e.g. 2 metre) flight path, but the level of defocusing (difference in power supply to the ion mirrors) would have to be far greater, or the number of ions far lower.

An advantage of defocusing ions in this manner is that many single ion pulses can be registered in a single acquisition, making single ion calibration accessible even to relatively slow analysers, such as MR-TOF analysers. Statistical methods based on pulse height variation are compatible with such analysers, but are slow and potentially contain substantial systematic errors. Another advantage of defocusing ions to produce single ions is it avoids the need for careful attenuation of the beam to remove multiple ion peaks but minimise empty spectra that would be required via beam attenuation methods.

Figure 5:
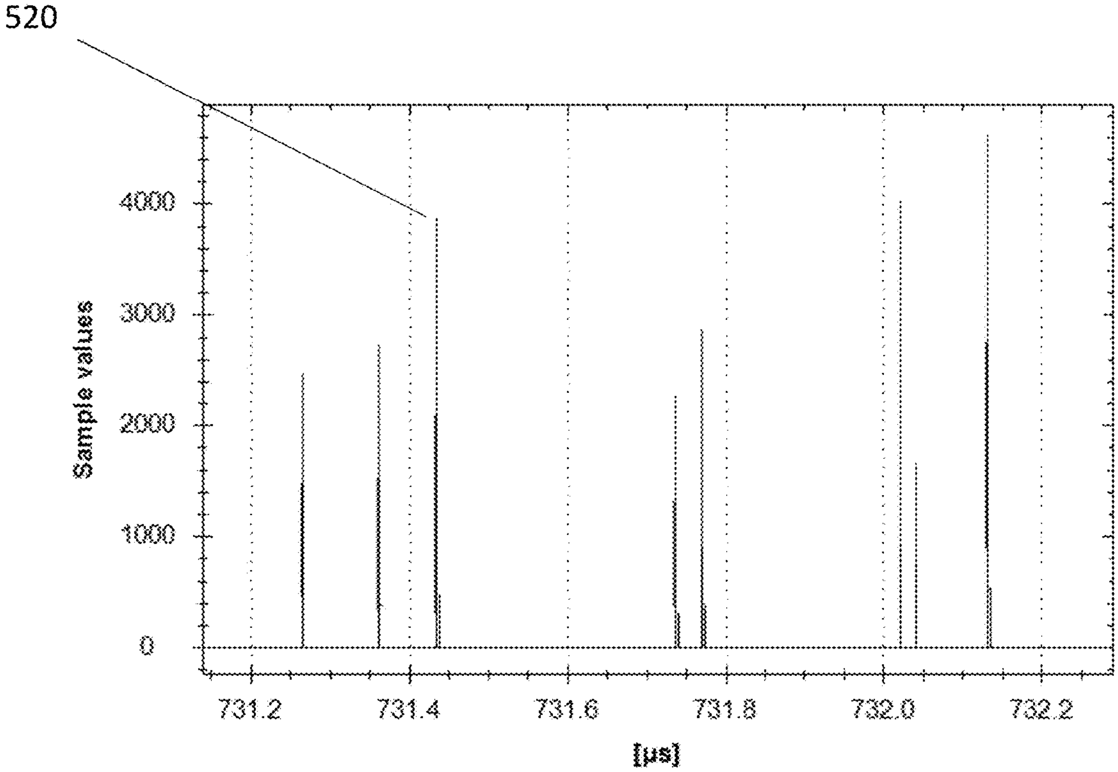
FIG. 5 shows an example of a spread of single ions obtained by time-defocusing a TOF detector as described herein.

An example of a spread of single ions having an m/z of 524 is shown in FIG. 5, as recorded by a mass analyser configured in the manner described with reference to FIG. 4 and with the ion mirror set to a defocusing mode. Peaks 520 indicate an ion arriving at the detector. As shown by the peaks 520 in FIG. 5, single ions having the same m/z arrive at the detector at different recorded times, due to the time-defocusing mode of the analyser.

Figure 6A:
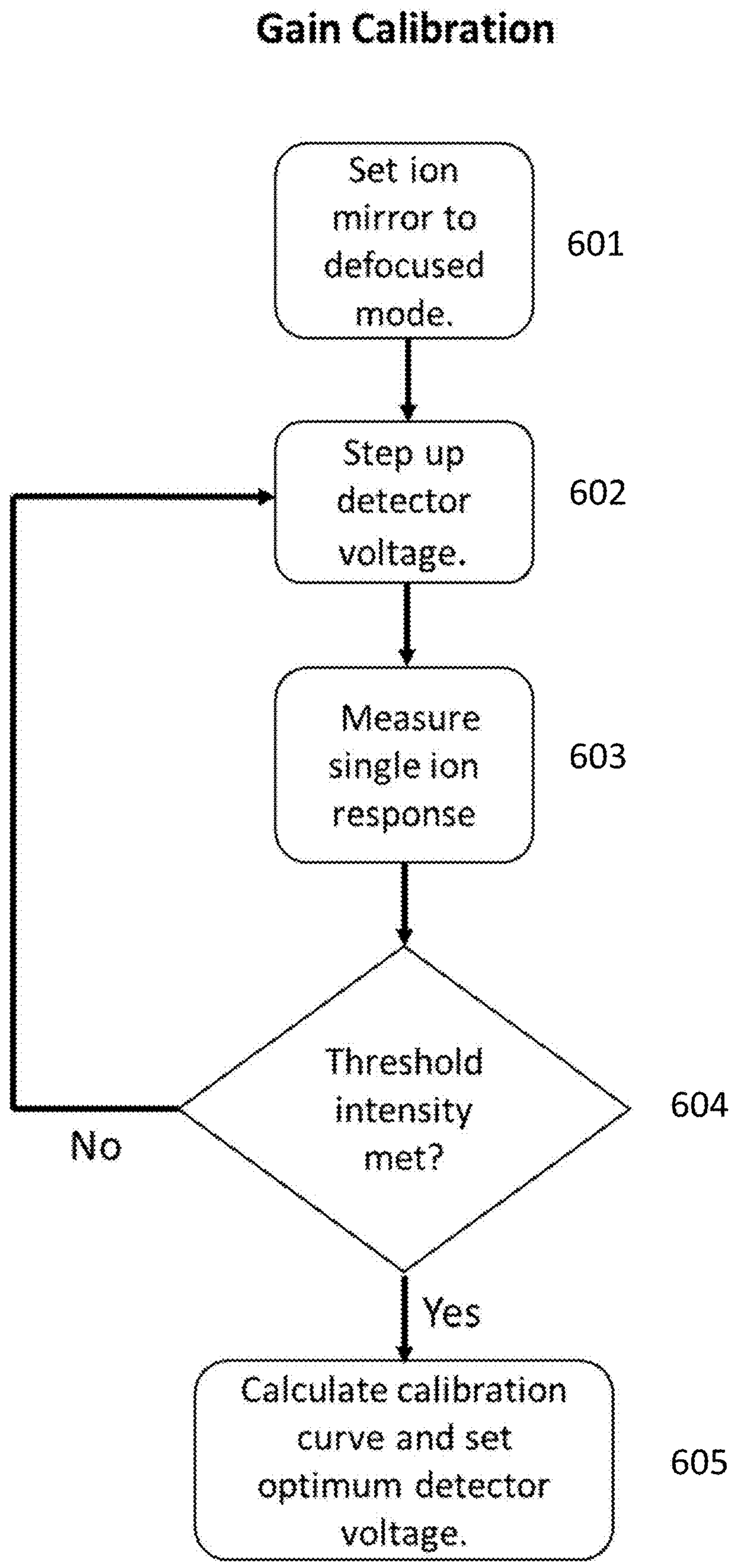
FIG. 6A shows a flowchart describing a detector gain calibration procedure based on a direct single ion measurement.

FIG. 6A shows a flowchart method for calibrating detector gain via defocused single ions. This method is similar to the more general method described in FIG. 3A.

In step 601, the ion mirror voltages are set to destroy a focus of the TOF analyser, such that ions having the same m/z will not arrive at the detector at the same time. In step 602, a detector voltage/gain may be increased from its initial value. Alternatively, the detector voltage/gain may be decreased from its initial value. Single ion responses (if detectable at this level) may then be measured in step 603, such that a parameter of a first relationship between an output of the ion detector (e.g. a current or voltage) and a number of ions for the first detector voltage can be determined. The single ion responses are then compared to a pre-set upper limit (step 604). The pre-set upper limit may be a limit above a noise level. For example, the pre-set upper limit may be 10, 30 or 100 times the noise level. Alternatively, the pre-set upper limit may be a signal area/intensity. Providing the pre-set upper limit may make sure that the ions remain within the dynamic range of the detector.

If the pre-set upper limit is not met (step 604 proceeding to No), then the detector voltage is increased (stepped up) and re-measured until it is (steps 602-604). Finally, in step 605, with the single ion and voltage data acquired, a curve may then be fitted/calculated that represents a relationship between the detector output and the number of ions for the first detector voltage. A suitable detector voltage may be extrapolated from this curve and the detector voltage may be set to this value.

This method requires one or few acquisitions for each voltage step, so for an analyser operating at 100 Hz, this can be a relatively fast process. In comparison, statistical prior-art methods require hundreds of acquisitions for each step and take several minutes to complete.

The method described with reference to FIG. 6A may vary in many ways. For example, the detector voltage scan range may be fixed in absolute terms or relative to the start value, or voltages may be randomly selected within a pre-set range to reduce influence of ion source fluctuations.

Figure 6B:
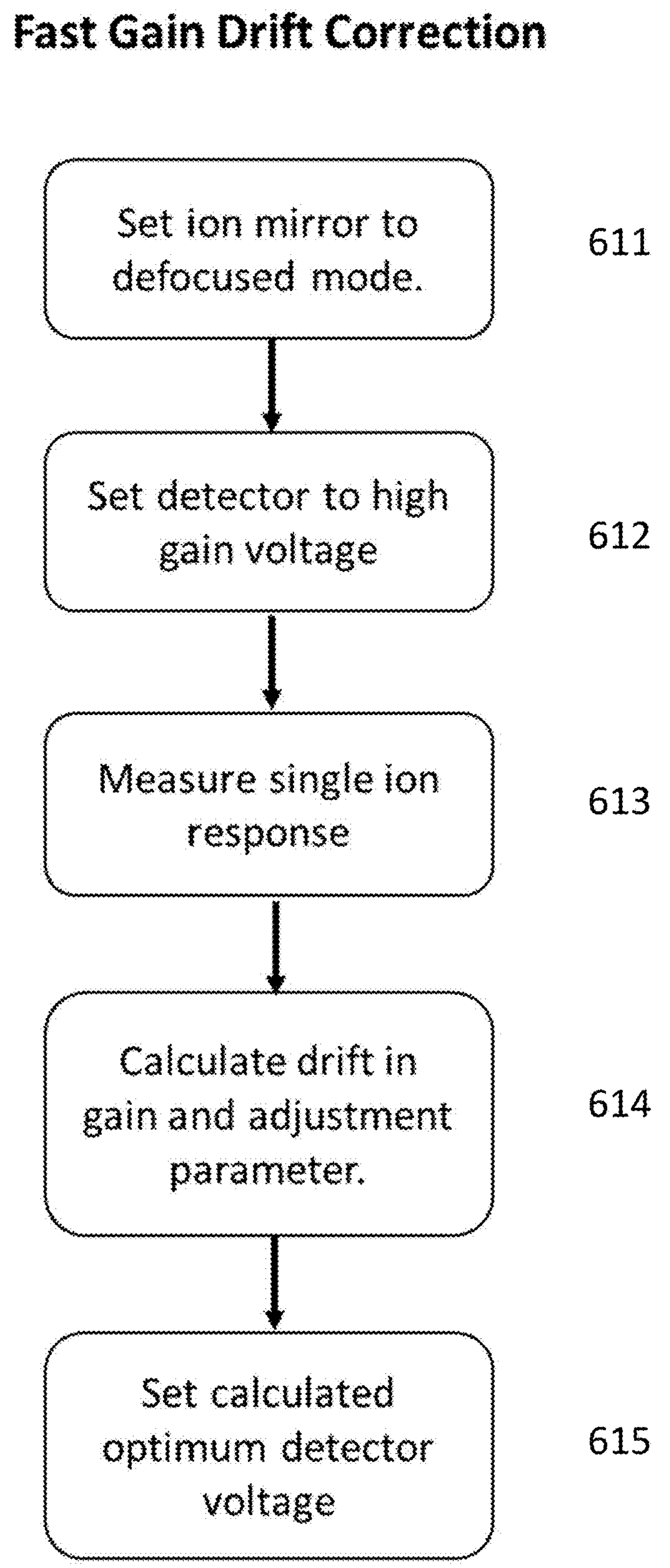
FIG. 6B illustrates a flowchart describing a fast gain correction method suitable for interleaving into experimental runs.

The process of FIG. 6A, whilst faster than conventional methods, is too slow to operate for detector monitoring within an experiment. A second method suitable for such monitoring is shown in FIG. 6B. At step 611, the ion mirror(s) are set to the defocused mode described with reference to FIG. 4. Then, at steps 612 and 613, the detector voltage is set to a voltage that produces a high gain (i.e. an ion incident on the detector produces a large number of electrons) and a single ion response is measured. This response is compared to the single ion response to a previous measurement. The previous measurement may be obtained using the method of FIGS. 3, 6A or another method described herein (e.g. with reference to FIG. 10).

At step 614, the drift in the gain, and an adjustment parameter to correct the gain drift, can be calculated. The drift can be corrected either by adjusting (increasing/decreasing) the detector voltage based on a previously measured calibration curve (e.g. as obtained from the method of FIG. 3 or 6A) or, for small gain shifts, adjusting the peak intensities, for instance by performing a short scans with small voltage steps until an appropriate gain value is reached. Since these measurements are very fast, many can be carried out during an experiment, such as a chromatographic separation, and a moving average generated.

Choice of analyte ions for this step may be from the sample itself, chosen dynamically, or be a background or calibration sample delivered through a primary or a secondary ion source.

The calculated optimum detector voltage for the detector may be set in step 615.

As an approximate m/z for time-defocused ions may still be determined with the methods described above, measurement of multiple single ions of different m/z ratios may be performed simultaneously. Thereby, the statistical accuracy of the measurement may be improved and the calibration of the detector response to m/z is possible. The accuracy may be further improved by calculating a specific time-m/z calibration for the time-defocused ions.

Similarly, a response of different charge states of analyte ions may also be measured and calibrated too, if these are present in the sample or calibration mixture. A regular mass spectral measurement may be made in advance of the defocused single ion measurement to determine what ions are in the sample. Quadrupole isolation of desirable ions for measurement may be performed.

The fast gain adjustment method described with reference to FIG. 6B advantageously avoids the need for replotting calibration curves, due to the assumption that that the trends from a previously acquired curve (e.g. using the method of FIG. 6A) hold true. Using the method of FIG. 6A, the optimum gain to detect single ions is lower than would be preferred to properly measure a single ion area, as small single-ion peaks sit nested in noise and are often only a single sampling point on a 1-2 gigasamples per second (GS/s) digitiser. Thus, the selection of detector voltage will normally be based on an extrapolation from an edge of the calibration curve (e.g. as shown in FIG. 8).

Figure 7:
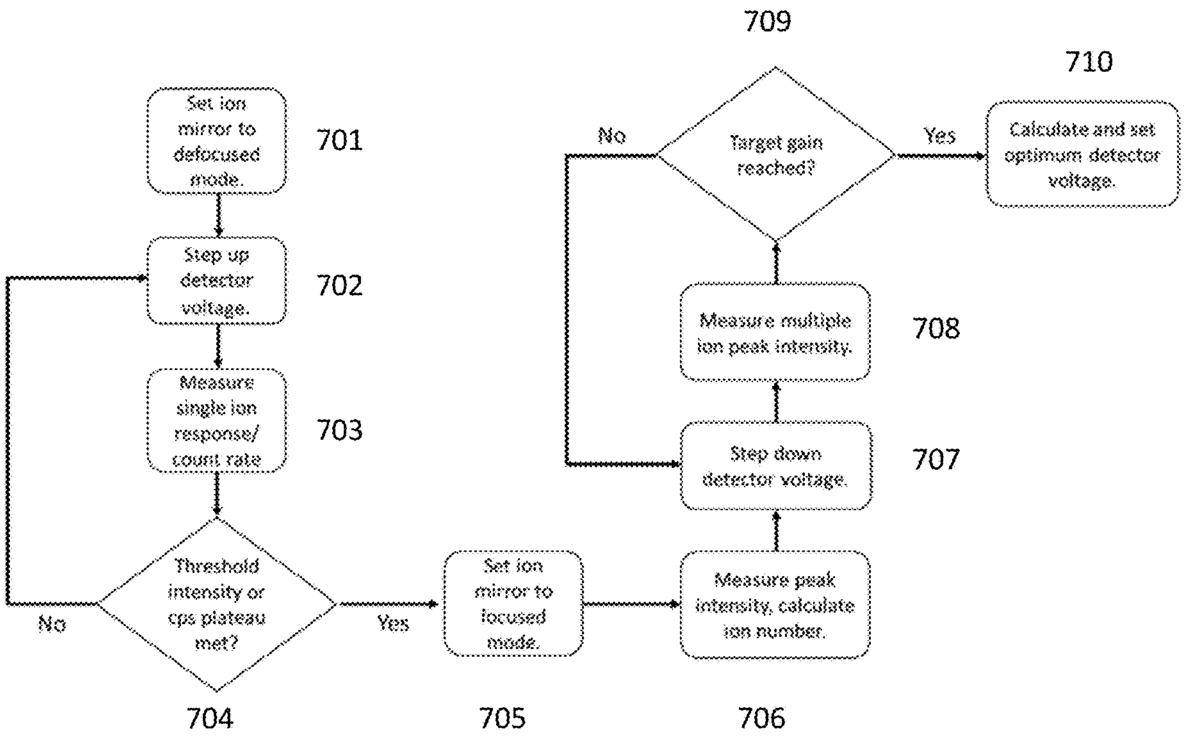
FIG. 7 illustrates a flowchart showing an indirect detector gain calibration method that combines a time-defocused single ion method and focused multiple ion method.

Therefore, as shown in FIG. 7, after reaching a suitable detector voltage for a single ion measurement, an ion packet may be refocused to generate a multiple-ion response. This can then be used as a known number of ions for gain calibration at a lower range of detector voltages. This method involves an inversion of the process shown in FIG. 6A (with multiple ion peaks instead of single ion peaks) until a lower threshold gain is determined.

Steps 701-704 correspond to steps 601-604 of FIG. 6A. If the threshold intensity or counts per second (cps) plateau is met at step 704, the ion mirror is set to a focused mode in step 705. That is, ions having the same m/z ratio will arrive at the detector at the same time (i.e. will temporally converge). Therefore, ion peaks detected by the detector will comprise a plurality of ions.

Steps 701-704 could be replaced with another method described herein (i.e. steps 705-710 could be used in combination with another method described herein). The only requirement is that a parameter of a first relationship is determined prior to step 705. Therefore, steps 705-710 could be used in combination with a method that will be described with reference to FIG. 10, for example.

At step 706, the peak intensity of the detected peak is measured and the number of ions calculated based on the determined parameter of the first relationship. That is, the previously determined single ion response can be used to determine the number of ions in the detected peak that comprises multiple ions.

In step 707, the voltage of the detector is adjusted. In the case where this step is preceded by steps 701-704 (corresponding to steps 601-604), the detector voltage will be stepped down/decreased. However, in the case that steps 705-710 are used in combination with other methods described herein, the detector voltage could instead be stepped up/increased. For example, if used in combination with the method described with reference to FIG. 10, the detector voltage could be increased or decreased in step 707.

At step 708, the intensity of the ion peak detected by the detector is measured. As mentioned above, this ion peak will comprise a plurality of ions, as the ion mirror was set to a focused mode in step 705.

In step 709, it is determined whether the target gain has been reached and whether the ion peak remains above the level of noise. The signal should be strong enough on average that smaller single ion results are not lost in noise. A signal at least 10 times above the noise level is sufficient, and preferably, the signal is 30 times or 100 times the noise level. If the signal is much larger than this, a large single ion pulse may saturate the detector.

If, at step 709, it is determined that the target gain has not been reached/the ion peak is not sufficiently above the noise level, the method returns to step 707. Otherwise, the method continues to step 710, where the optimum detector voltage is calculated and set. An advantage of this method is that gain can be quickly measured around the optimum detector voltage/target gain level. A calibration curve can constructed from the focused multiple ion peak during steps 707-709, but without the need to calculate a calibration curve from single ion responses (e.g. during steps 702-704). This should improve accuracy and robustness of the gain calibration.

There is a risk of saturation at the point of comparison of single and multiple ion peaks. However, it is relatively simple to detect saturated peaks and, for an instrument with an ion trap, it is very easy to proportionally control the ion population via a change of accumulation time.

Detectors with high dynamic range can handle thousands of ions in a multiple ion peak (especially if broadened under space charge) without saturation, even when the gain is far higher than is optimal. In any case, detector over-voltage is easily detectable and may be flagged. Since the number of ions in a multiple ion peak may be inferred from the number of ions in a time-defocused spread (as the two should match closely), it is easy to prevent overload in view of the number of ions in the time-defocussed spread. AGC methods may also optionally be used to adjust ion population in the multiple ion shots relative to the single ion spreads, without significant loss of accuracy in ion number determination.

Calibration curves of single ion area against detector voltage are shown in FIG. 8. These include repeated measurements of the indirect method shown in FIG. 7, a single direct measurement of single ions (e.g. using the method of FIG. 6A), and a direct measurement carried out by manually setting the detector voltages and analysing the resulting spectra. It can be seen from FIG. 8 that the values are generally in reasonable alignment within 10% of the average, except that at low detector voltages, the direct measurement breaks down as single ions fall into the noise band and cannot be detected anymore.

Figure 9:
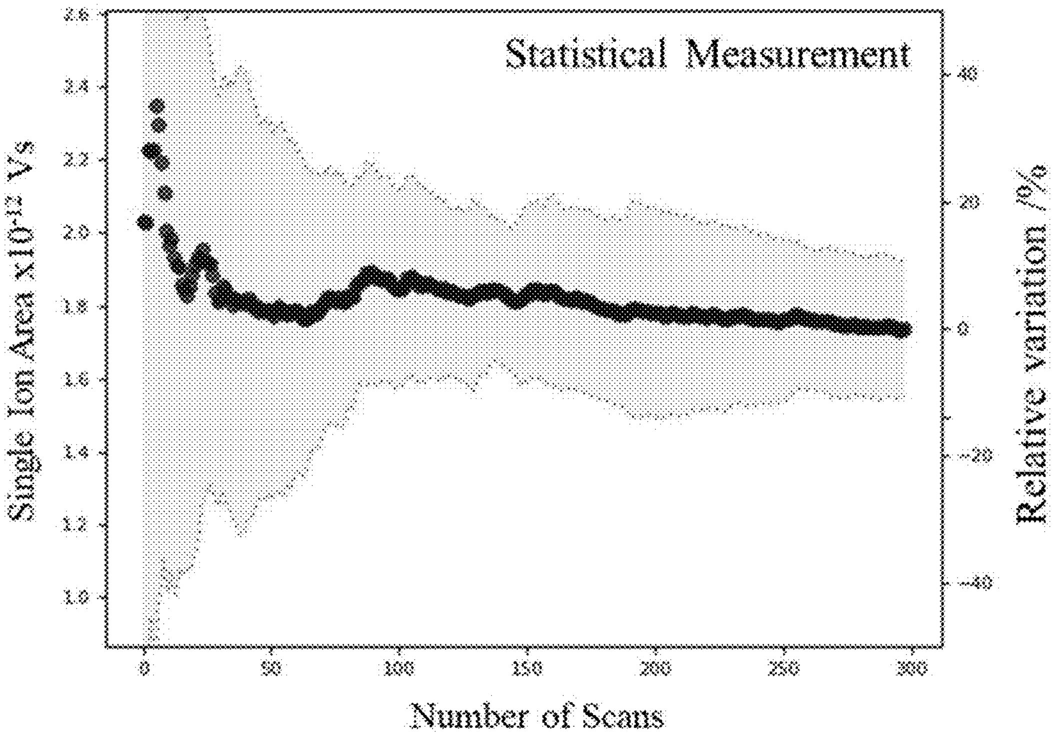
FIG. 9 shows a comparison of a statistical method of determining a single ion area and the indirect single ion measurement described herein.
Figure 9:
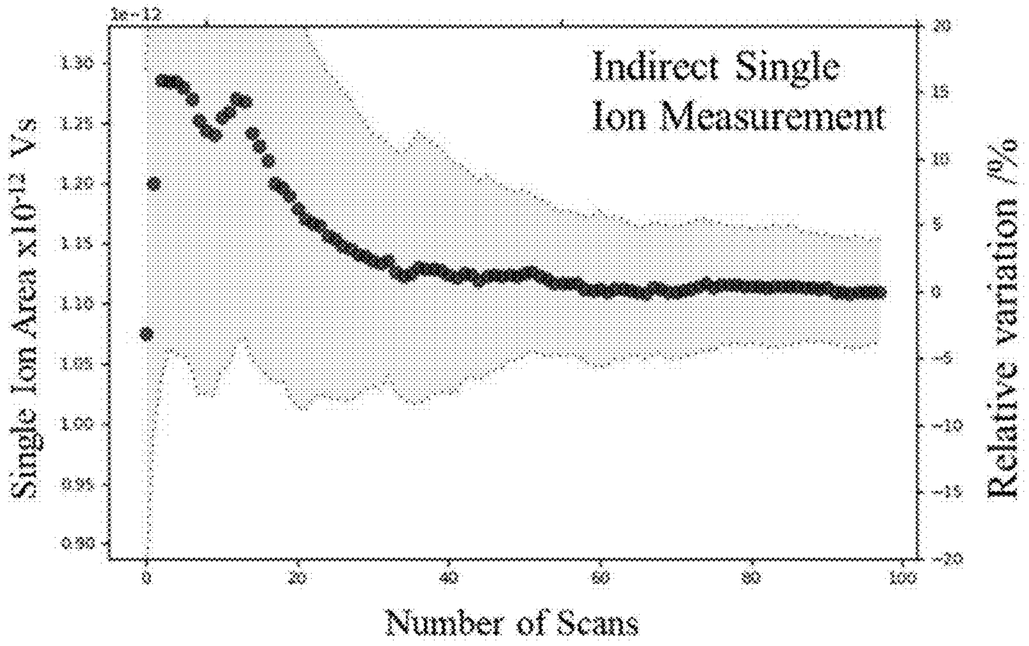

A second practical comparison was made between the indirect single ion measurement method (as described with reference to FIG. 7) and a statistical method based on that described in U.S. Pat. No. 7,109,474. This comparison is shown in FIG. 9. At a fixed detector voltage, scans were made for both methods and repeated single ion area (SIA) determinations made for multiple batches of increasing numbers of scans. The average SIA and standard deviation for both methods are shown in FIG. 9, which shows that the single ion method becomes reproducible to within 5% within 50 scans per measurement, but the statistical method does not reach this level, even at 300 scans. The single ion method is approximately an order of magnitude quicker than the statistical method to reach similar levels of reproducibility. It is also notable that the single ion method produces a much lower average single ion area value than the statistical method ($1.1\times10^{-11}$ Vs rather than $1.8\times10^{-11}$ Vs, respectively). This is thought to be due to a systematic error caused by uncontrolled noise sources in the statistical method.

Another gain calibration method is possible for hybrid instruments mixing a charge detecting analyser, such as an orbital trapping mass spectrometer with a second analyser relying on an electron multiplier, such as a TOF or ion trap analyser. The method could also be applied with a Fourier transform ion cyclotron resonance mass spectrometer (FT-ICR) and TOF analyser, orbital trapping mass spectrometer/ion trap or FT-ICR/ion trap hybrid instrument. The method involves cross-calibration between the two parts of the hybrid instrument. The cross-calibration method can be used for calibration of gain and/or more simple monitoring and adjustment of gain over time, as will be described below.

Orbital trapping mass spectrometers detect current induced by charge packets moving between the two sides of the analyser, and for more than 100 ion packets produce consistent signal/noise (S/N) peaks in proportion to the number of ions. As orbital trapping mass spectrometers do not suffer rapid shifts in transmission or ageing, the peak signal/noise may be used as an ion number measurement against which to calibrate detector gain or monitor detector ageing.

Orbital trapping mass spectrometer pre-amplifiers are not sensitive enough to detect singly charged single ions themselves, but can be used to detect multiply charged single ions (for example, as described in Makarov et al, "Dynamics of Ions of Intact Proteins in the Orbitrap Mass Analyzer", Journal of the American Society for Mass Spectrometry, Volume 20, Issue 8, August 2009, Pages 1486-1495). Briefly, detection of individual ions can be proven if the intensity of peaks in ion spectra follow a quantised S/N ratio distribution (i.e. S/N changes in quantum steps as 1, 2, 3, etc.). The S/N response of a singly charged single ion may be inferred from such measurement and thus the number of ions in a multiple-ion peak calculated.

Orbital trapping mass spectrometer analysers are typically conjoined to curved ion traps (C-Trap), which serve to prepare ions for injection into them. These may easily overfill and suffer excessive space charge effects without automatic gain control (AGC) methods to regulate accumulation time and ion population.

A standard method of automatic gain control for dual orbital trapping mass spectrometer/ion trap analyser hybrid instruments, such as the Orbitrap Fusion® manufactured by Thermo Fisher Scientific, Inc., is to measure the ion population at the calibrated electron multiplier detector of the ion trap, and use that data to regulate the accumulation time at the C-Trap. The method proposed herein of using the orbital trapping mass spectrometer signal intensity or signal/noise ratio to regulate the detector voltage is somewhat of a reverse of this standard method.

Figure 10:
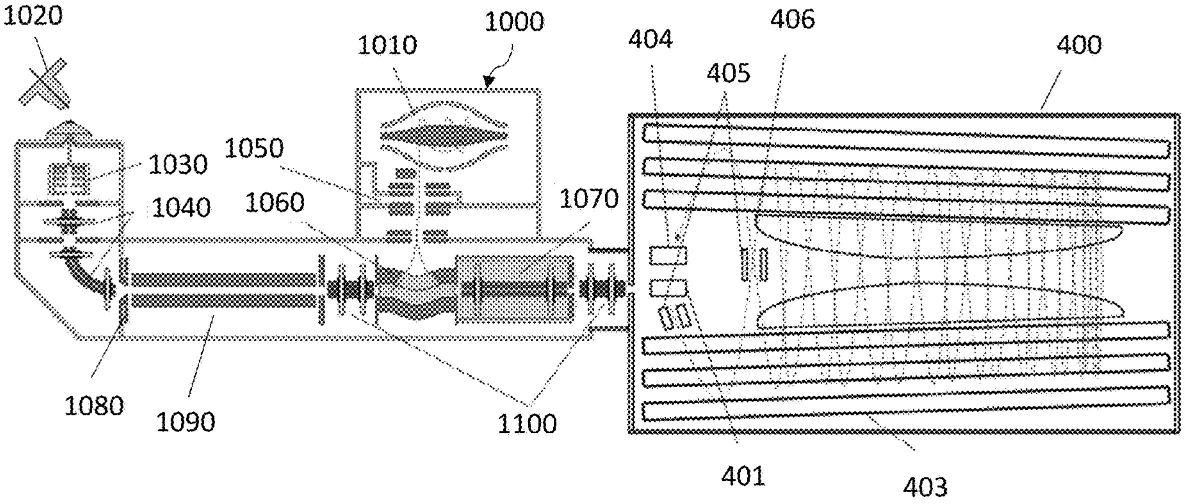
FIG. 10 illustrates an example hybrid orbital trapping mass spectrometer and TOF instrument that can be used with the methods described herein.

A hybrid orbital trapping mass spectrometer time-of-flight mass spectrometer suitable for carrying out methods in accordance with embodiments of the present disclosure is shown in FIG. 10. The TOF analyser 400 in this Figure is similar to that shown in FIG. 4.

Single ions may be produced using an ESI source 1020. It will be understood that other methods, such as described with reference to FIG. 3A, may be instead be used to generate single ions.

The single ions then enter the mass spectrometer 1000 and pass through an RF-lens 1030. The ions are focused by the lens 1030 into first and second ion guides 1040. Charged ions are guided along the curved path of the second ion guide 1040, whilst any neutral ions are not and do not proceed through the mass spectrometer 1000.

An ion gate 1080 controls the transmission of the ions from the curved ion guide 1040 into mass filter 1090. The mass filter 1090 can allow ions of a selected mass number or mass range to pass, whilst excluding ions of other m/z ratios. Alternatively, the mass filter 1090 can be operated in an RF-only mode, where it transmits substantially all ions, regardless of m/z.

The ions are then guided by a third ion guide 1100 into a C-trap 1060 for ion injection into a first mass analyser 1010 (e.g. an FTMS, such as an orbital trapping mass spectrometer). The C-trap (first ion trap) 1060 has curved electrodes extending in a longitudinal direction that are supplied with RF voltages and end caps to which DC voltages are supplied. Accordingly, a potential well is formed that extends along the curved longitudinal axis of the C-trap 1060. In a first mode, the DC end cap voltages are set such that the single ions arriving from the ion guide 1100 are trapped in the potential well of the C-trap 1060, where they are cooled.

The cooled ions are then ejected from the C-trap 1060 into the first mass analyser 1010 via a z-lens 1050 into an off-centre injection cavity of the first mass analyser 1010. The ions are then trapped within the orbital trapping mass analyser by a logarithmic electric field, such that their orbital motion around the axis of the analyser is (approximately) harmonic. Thus, the ions separate according to their m/z ratio.

The ions are detected using an image detector (not shown) that produces a "transient" in the time domain, containing information on the ions' species, as they pass the image detector. A Fast Fourier Transform (FFT) is applied to the transient to convert the data into a series of peaks in the frequency domain. A mass spectrum can then be produced, with axes of ion abundance/ion intensity against m/z (similar to that shown in FIG. 5, except that the x-axis in FIG. 5 corresponds to time of flight in μs).

Although FIG. 10 shows an FTMS 1010 in which ions are trapped axially and radially by an electrostatic field, it will be understood that other forms of FTMS are contemplated, such as, for example, an FT-ICR mass analyser. In an FT-ICR mass analyser, ions are trapped axially by an electrostatic field, with radial and azimuthal trapping achieved by applying a magnetic field. The primary requirement of the FTMS 110 is that its output (that is, the position and shape of peaks in a mass spectrum it generates) should be relatively stable over time (e.g. with respect to short and long term shifts in temperature).

The C-trap 1060 is then switched to a second mode to allow the ions from the FTMS 1010 to pass through axially towards the fragmentation chamber 1070. The fragmentation chamber 1070 may serve as an ion guide for the ions (i.e. the ions are not subjected to a collision gas/the energy of the collision gas is insufficient to fragment the precursor ions). The fourth ion guide 1100 then guides the ions from the fragmentation chamber 1070 into the extraction trap 401. The extraction trap 401 accumulates ions ejected from the fragmentation chamber 1070 prior to injection into the TOF mass analyser 400.

In accordance with the present disclosure, the mass spectrum produced by the FTMS 1010 may be used to determine a parameter of a first relationship between the detector output and the number of ions for the first detector voltage. For instance, the S/N ratio for multiply charged single ions can be determined as described above and the S/N response for a singly charged single ion calculated. This can then be used as a parameter to determine the number of ions in a multiple-ion peak, as the S/N ratio should be proportional to the number of ions in the peak. The multiple-ion peak is generated as described above with reference to FIG. 10, using multiple ions instead of generating single ions.

The gain of a second analyser 400 (for instance, a TOF analyser or ion-trap) can be calibrated as described with reference to FIGS. 3A and 6A. That is, the detector voltage of the second analyser 400 can be adjusted to a second voltage at which the detector output for the ion peak remains above a noise level. Then, a parameter of a second relationship between the detector output and the number of ions for the second detector voltage determined, based on the determined number of ions in the multiple-ion peak. The second analyser can then operate at the second detector voltage.

Correction to the number of ions would have to be made to account for transmission of ions into and/or loss of ions in the orbital trapping mass spectrometer 1010 (which may be about 30-50% loss) and an estimate of transmission to the detector on the second analyser 400, which may limit the accuracy of such calibration. That is, the number of ions in the ion-peak calculated using the determined parameter will not directly correspond to the number of ions in the second analyser 400, so needs to be corrected. The transmission of ions into the orbital trapping mass spectrometer 1010 may depend on various instrument factors, for instance including one or more of detector voltages, ramp times, ion m/z and the type of orbital trapping mass spectrometer 1010.

Alternatively/additionally, the parameter determined for the FTMS 1010 can be used to monitor/correct a drift in gain over time, similarly to the method described with reference to FIGS. 3B and 6B. For example, the S/N ratio known from the FTMS 1010 can be used to calculate a drift in the gain of the less stable second analyser 400 and an adjustment parameter to correct the drift in the gain. The drift can then be corrected either by adjusting (increasing/decreasing) the detector voltage of the second analyser 400 or, for small gain shifts, by adjusting the peak intensities.

In particular, the gain calibration of the ion detector can be monitored by detecting a second peak at the FTMS 1010 using a third detector voltage. The third detector voltage may be the same as the first detector voltage of the FTMS 1010 during the initial gain calibration. Since the S/N ratio of the FTMS 1010 is relatively stable over time, the previously determined S/N ratio can be used to determine the number of ions in the second ion peak. As above, correction to this number would be required to account for the transmission of ions into the detector in the second analyser 400.

Then, a second parameter of the second relationship between the detector output of the ion detector and the number of ions for the third detector voltage can be determined, based on the determined number of ions in the second ion peak. For example, the S/N ratio of the FTMS 1010 may result in a determination (based on the transmission rate) that 100 ions will be transferred to the second analyser 400. Thus, a peak of 200 mV intensity may correspond to a second parameter of 2 mV per ion.

The second parameter can then be compared to an expected value, based on the first relationship. This may be a direct comparison between the first parameter of the second relationship and the second parameter of the second relationship. That is, the expected value of the second parameter may be the value of the first parameter. Alternatively, the expected value of the second relationship may be determined based on a calibration curve, which may be obtained, for example, during steps 302-304, or steps 702-704 and/or 707-709.

It may then be determined, based on the comparison, whether a drift in the gain has occurred. For example, if the first parameter of the second relationship and the second parameter of the second relationship are different values, it may be determined that a drift in the gain has occurred. Alternatively, if the expected value of the second relationship from the calibration curve differs from the second parameter of the second relationship, a drift gain may have occurred. There may be a tolerance level for this difference, below which it will not be determined that a drift gain has occurred. This may avoid excessive correction of the gain calibration.

It is preferable for the cross-calibration method that a known sample be used, for example to standard calibration mixture (e.g. Pierce Flexmix manufactured by Thermo Fisher Scientific, Inc.). If an unknown analyte is used, care must be taken to determine that it is not multiply charged, as highly multiply charged ions with closely packed isotopes produce interference patterns within the orbital trapping mass spectrometer that reduce the apparent signal/noise and compromise the assessment of the number of ions in a peak.

An advantage of the cross-calibration method using an FTMS (such as an orbital trapping mass spectrometer) described herein is that a measurement with single ions only needs to be made once, on one FTMS. The behaviour is sufficiently similar with time and across other instruments that those instruments do not need their own calibrations (or regular recalibrating), to a reasonable approximation. It will be understood that properties of a pre-amplifier that cause differences in signal between instruments, such as component tolerances, also create a similar influence in noise, so the signal to noise ratios become relatively consistent.

The number of ions that produces a particular signal to noise ratio thus becomes a known property for the class of instruments, rather than something that must be calibrated for each instrument. A more accurate result may be obtained by calibration of a specific instrument, but such accuracy may not be required and the result is not thought to change much with time.

The cross-calibration method is fast and relatively stable. It can also advantageously be carried out in conjunction with other cross-calibration methods (e.g. mass cross-calibration).

The following clauses describe illustrative embodiments only. These illustrative embodiments may be implemented with any of the embodiments described herein. For example, gain may be calibrated using the method of clause A1 and monitoring of the gain calibration may be carried out using the method described with reference to FIG. 6B. Similarly, the parameter of the first relationship and the first parameter of the second relationship may be determined using the method described with reference to FIG. 6A, in order to monitor the gain calibration using the method of clause A2 or A3.

A1. A method of gain calibration for an ion detector operating at a detector voltage and forming part of a hybrid mass spectrometer, the method comprising steps of:

generating single ions;

determining a parameter of a first relationship between a detector output of a first ion detector device and a number of ions for a first detector voltage, by detecting single ions at the first ion detector device; and detecting an ion peak at the first ion detector device using the first detector voltage, to determine a number of ions in the ion peak, based on the parameter of the first relationship, adjusting a detector voltage of a second ion detector device to reduce a ratio between a detector output of the second detector and a noise level and thereby obtain a second detector voltage at which the detector output for an ion peak detected at the second ion detector device remains above the noise level;

determining a parameter of a second relationship between the detector output of the second ion detector device and the number of ions for the second detector voltage, based on the determined number of ions in the ion peak.

A2. The method of clause A1, further comprising:

monitoring the gain calibration of the ion detector by:

detecting a second ion peak at the first ion detector device using a third detector voltage;

determining the number of ions in the second ion peak;

determining a parameter of a third relationship between the detector output of the first ion detector device and the number of ions for the third detector voltage, based on the determined number of ions in the second ion peak;

comparing the second parameter of the second relationship to an expected value, based on the second relationship; and determining, based on the comparison, whether a drift in the gain has occurred.

A3. The method of clause A2, further comprising:

based on determining that a drift in the gain has occurred:

calculating an adjustment parameter, to adjust the detector voltage to a level at which the relationship between the detector output and the number of ions corresponds to the expected value of the second parameter of the second relationship, based on the second relationship; and setting the detector voltage, based on the adjustment parameter.

A4. The method of any previous clause, wherein the second ion detector device forms part of a time-of-flight mass spectrometer (TOF MS) or ion trap.

A5. The method of any previous clause, wherein the first ion detector device forms part of a Fourier transform mass spectrometer (FTMS).

A6. The method of clause A5, wherein the FTMS is an orbital trapping mass spectrometer or Fourier transform ion cyclotron resonance mass spectrometer (FT-ICR).

A7. The method of any previous clause, further comprising:

operating the second ion detector device at the second detector voltage.

A8. The method of clause A5, wherein the parameter of the first relationship is a signal-to-noise (S/N) ratio for a single ion.

A9. The method of claim A8, further comprising:

detecting multiply-charged single ions at the first ion detector device;

calculating the S/N ratio of the multiply-charged single ions;

determining the S/N ratio of a singly-charged single ion, based on the calculated S/N ratio of the multiply-charged single ions.

A10. The method of any previous clause, wherein following the determination of the number of ions in the ion peak, a correction factor is applied to the determined number of ions is corrected to account for transmission of ions to the second ion detector device.

A11. The method of clause A10, wherein the correction factor is between 30% and 50%.

A12. The method of any previous clause, further comprising:

generating the single ions by beam attenuation, fragmentation, scattering ions with background gas or using an electrospray ionisation (ESI) source.

The methods described herein may be implemented with computer system configurations including hand-held devices, microprocessor systems, microprocessor-based or programmable consumer electronics, minicomputers, mainframe computers and the like. The embodiments can also be practiced in distributed computing environments, where tasks are performed by remote processing devices that are linked through a network.

Certain embodiments can also be embodied as computer-readable code on a non-transitory computer-readable medium. The computer readable medium is any data storage device than can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although embodiments according to the disclosure have been described with reference to particular types of devices and applications (particularly mass spectrometers) and the embodiments have particular advantages in such case, as discussed herein, approaches according to the disclosure may be applied to other types of device and/or application. The specific calibration details of the ion detector, whilst potentially advantageous (especially in view of known calibration constraints and capabilities), may be varied significantly to arrive at devices with similar or identical operation. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the aspects and/or features disclosed in this specification may be combined in any combination, except combinations where at least some of such features and/or steps are mutually exclusive. In particular, the preferred features of the disclosure are applicable to all aspects and embodiments of the disclosure and may be used in any combination. Likewise, features described in non-essential combinations may be used separately (not in combination).

It will be appreciated that there is an implied "about" prior to temperatures, concentrations, times, pressures, flow rates, cross-sectional areas, voltages, currents, etc. discussed in the present teachings, such that slight and insubstantial deviations are within the scope of the present teachings.

As used herein, including in the claims, unless the context indicates otherwise, singular forms of the terms herein are to be construed as including the plural form and vice versa. For instance, unless the context indicates otherwise, a singular reference herein including in the claims, such as "a" or "an" (such as an ion packet) means "one or more" (for instance, one or more ion packets).

Throughout the description and claims of this disclosure, the words "comprise", "including", "having" and "contain" and variations of the words, for example "comprising" and "comprises" or similar, mean "including but not limited to", and are not intended to (and do not) exclude other components. Also, the use of "or" is inclusive, such that the phrase "A or B" is true when "A" is true, "B is true", or both "A" and "B" are true.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

The terms "first" and "second" may be reversed without changing the scope of the invention. That is, an element termed a "first" element may instead be termed a "second" element and an element termed a "second" element may instead be considered a "first" element.

Any steps described in this specification may be performed in any order or simultaneously unless stated or the context requires otherwise. Moreover, where a step is described as being performed after a step, this does not preclude intervening steps being performed.

It is also to be understood that, for any given component or embodiment described herein, any of the possible candidates or alternatives listed for that component may generally be used individually or in combination with one another, unless implicitly or explicitly understood or stated otherwise. It will be understood that any list of such candidates or alternatives is merely illustrative, not limiting, unless implicitly or explicitly understood or stated otherwise.

In this detailed description of the various embodiments, for the purposes of explanation, numerous specific details are set forth to provide a thorough understanding of the embodiments disclosed. One skilled in the art will appreciate, however, that these various embodiments may be practiced with or without these specific details. Furthermore, one skilled in the art can readily appreciate that the specific sequences in which methods are presented and performed are illustrative and it is contemplated that the sequences can be varied and still remain within the scope of the various embodiments disclosed herein.

All literature and similar materials cited in this application, including but not limited to patents, patent applications, articles, books, treaties and internet web pages are expressly incorporated by reference in their entirety for any purpose. Unless otherwise described, all technical and scientific terms used herein have a meaning as is commonly understood by one of ordinary skill in the art to which the various embodiments described herein belongs.

The invention claimed is:

1. A method of gain calibration for an ion detector operating at a detector voltage, the method comprising steps of:

generating single ions;

determining a parameter of a first relationship between a detector output of an ion detector and a number of ions for a first detector voltage, by detecting single ions at the ion detector;

detecting an ion peak at the ion detector using the first detector voltage, to determine a number of ions in the ion peak, based on the parameter of the first relationship;

adjusting the detector voltage to reduce a ratio between the detector output and a noise level and thereby obtain a second detector voltage at which the detector output for the ion peak remains above the noise level;

determining a parameter of a second relationship between the detector output and the number of ions for the second detector voltage, based on the determined number of ions in the ion peak.

2. The method of claim 1, further comprising:

monitoring a gain calibration of the ion detector by:

detecting a second ion peak at the ion detector using a third detector voltage;

determining a number of ions in the second ion peak;

determining a second parameter of the second relationship between the detector output of the ion detector and the number of ions for the third detector voltage, based on the determined number of ions in the second ion peak;

comparing the second parameter of the second relationship to an expected value, based on the second relationship; and determining, based on the comparison, whether a drift in the gain has occurred.

3. The method of claim 2, further comprising:

based on determining that a drift in the gain has occurred:

calculating an adjustment parameter, to adjust the detector voltage to a level at which the relationship between the detector output and the number of ions corresponds to the expected value of the second parameter of the second relationship, based on the second relationship; and setting the detector voltage, based on the adjustment parameter.

4. The method of claim 1, further comprising:

operating the ion detector at the second detector voltage.

5. The method of claim 1, wherein the ion detector forms part of a time-of-flight (TOF) mass spectrometer (MS).

6. The method of claim 5, further comprising:

generating the single ions by setting the TOF MS to operate in a time-defocused mode, in which ions having the same mass-to-charge (m/z) ratio arrive at the ion detector at different times.

7. The method of claim 2, wherein the ion detector forms part of a time-of-flight (TOF) mass spectrometer (MS) and detecting the second ion peak comprises setting the TOF MS to operate in the time-defocused mode, such that the second ion peak corresponds to a single ion.

8. The method of claim 1, further comprising:

step-wise adjusting the detector voltage during the step of adjusting the detector voltage; and calculating a calibration curve, based on the detector output generated by detecting single ions at the ion detector for each detector voltage step.

9. The method of claim 1, wherein the first relationship and the second relationship are the same relationship; and the parameter of the first relationship and the parameter of the second relationship are different.

10. The method of claim 1, wherein the ion detector comprises: a first ion detector device; and a second ion detector device; and wherein the steps of determining a parameter of a first relationship and detecting an ion peak at the ion detector are performed with respect to the first ion detector device and the steps of adjusting the detector voltage and determining a parameter of a second relationship are performed with reference to the second ion detector device.

11. The method of claim 10, wherein the second ion detector device forms part of a time-of-flight mass (TOF) mass spectrometer (MS) or an ion trap.

12. The method of claim 10, wherein the first ion detector device forms part of a Fourier transform mass spectrometer (FTMS).

13. The method of any of claim 10, wherein the FTMS is an orbital trapping or Fourier transform ion cyclotron resonance (FT-ICR) mass spectrometer.

14. The method of claim 2, wherein the ion detector comprises: a first ion detector device; and a second ion detector device; and wherein the steps of determining a parameter of a first relationship and detecting an ion peak at the ion detector are performed with respect to the first ion detector device, the steps of adjusting the detector voltage and determining a parameter of a second relationship are performed with reference to the second ion detector device, the step of detecting the second ion peak at the ion detector is performed with respect to the first ion detector device, and the step of determining a parameter of a third relationship is performed with reference to the second ion detector device.

15. The method of claim 10, wherein the parameter of the first relationship is a signal-to-noise (S/N) ratio.

16. The method of claim 15, further comprising:

detecting multiply-charged single ions at the first ion detector device;

calculating the S/N ratio of the multiply-charged single ions;

determining the S/N ratio of a singly-charged single ion, based on the calculated S/N ratio of the multiply-charged single ions.

17. The method of claim 10, wherein a correction factor is applied to the determined number of ions in the ion peak, to account for transmission of ions to the second ion detector device.

18. The method of claim 17, wherein the correction factor is between 30% and 50%.

19. The method of claim 1, further comprising:

generating the single ions by beam attenuation, fragmentation, scattering ions with background gas or using an electrospray ionisation (ESI) source.

20. A system comprising a mass spectrometer arrangement and a controller configured to operate the mass spectrometer arrangement in accordance with the method of claim 1.

* * * * *